US008792512B2

(12) United States Patent
Scott et al.

(10) Patent No.: US 8,792,512 B2

(45) Date of Patent: Jul. 29, 2014

(54) RELIABLE MESSAGE TRANSPORT NETWORK

(75) Inventors: Steven L. Scott, Eau Claire, WI (US); Dennis C. Abts, Eleva, WI (US); Robert Alverson, Seattle, WA (US); Edwin Froese, Burnaby (CA)

(73) Assignee: Intel Corporation, Santa Clara, CA (US)

( * ) Notice: Subject to any disclaimer, the term of this patent is extended or adjusted under 35 U.S.C. 154(b) by 1412 days.

(21) Appl. No.: 11/759,748

(22) Filed: Jun. 7, 2007

(65) Prior Publication Data

US 2008/0304491 A1 Dec. 11, 2008

(51) Int. Cl.
*H04L 12/28* (2006.01)
*H04L 12/56* (2006.01)

(52) U.S. Cl.
CPC .................................... *H04L 49/90* (2013.01)
USPC ........... 370/413; 370/230; 370/235; 370/351; 370/389; 370/412; 370/429; 370/474

(58) Field of Classification Search
None
See application file for complete search history.

(56) References Cited

U.S. PATENT DOCUMENTS 5,151,899 A * 9/1992 Thomas et al. ............... 370/394
6,629,285 B1 * 9/2003 Gerendai et al. ............. 714/748
6,922,804 B2 * 7/2005 Das Sharma .................. 714/746
2002/0165973 A1 11/2002 Ben-Yehezkel et al.

FOREIGN PATENT DOCUMENTS

EP 0969622 A2 1/2000

OTHER PUBLICATIONS

Internet Task Force, RFC 793 Transport Control Protocol, Sep. 1981.*
"European Application Serial No. 08251973.7, Extended European Search Report mailed Feb. 10, 2011", 8 pgs.
"European Application Serial No. 08251973.7, Response flied Sep. 15, 2011 to Official Communication mailed Mar. 21, 2011", 16 pgs.

* cited by examiner

*Primary Examiner* — Jae Y Lee
*Assistant Examiner* — Aixa A Guadalupe-Cruz
(74) *Attorney, Agent, or Firm* — Blakely, Sokoloff, Taylor & Zafman LLP

(57) ABSTRACT

A multiprocessor computer system comprises a sending processor node and a receiving processor node. The sending processor node is operable to send packets comprising part of a message to a receiver, to maintain a message buffer entry in the sender comprising the sent packets, to track acknowledgment from the receiver that sent packets have been received; to maintain a timer indicating the time since message data has been sent, and to resend packets not acknowledged upon the timer reaching a timeout state. The receiving processor node is operable to send acknowledgement to the sender that received packets have been received, to track packets using a received message table to track which packets comprising part of the message have been received and whether all packets in the message have been received, and to process packets once all packets in a message are received to reassemble the received message.

19 Claims, 3 Drawing Sheets

301 Sender allocates outstanding request buffer entry for message
302 Sender sends packets and buffers sent packets in ORB
303 Receiver receives first packet and allocates received message table entry
304 Sender outstanding request buffer entry times out and resends unacknowledged packets
305 receiver receives resent packet and acknowledges receipt
306 Sender receives packet acknowlegment and sends "message acknowledged" packet
307 Receiver acknowledges "message acknowledged" packet to sender
308 RMT and ORB entries are deallocated
309 Message and completion queue command sent to receiver's processor 205
205
201
206
Outstanding Request Buffer
202
MID
203
207
Received Message Table
204

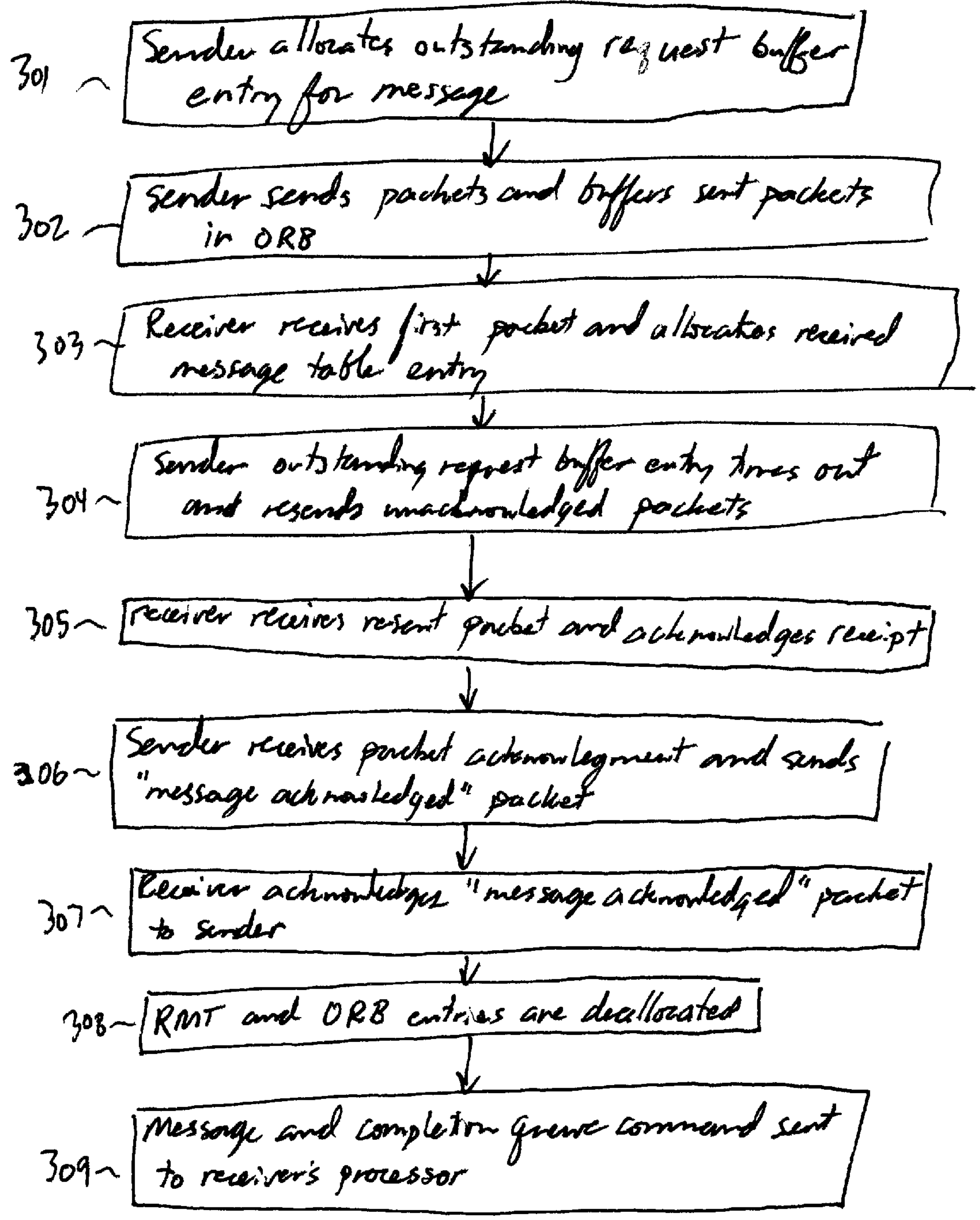
Fig. 3
301
Sender allocates outstanding request buffer entry for message
302
Sender sends packets and buffers sent packets in ORB
303
Receiver receives first packet and allocates received message table entry
304
Sender outstanding request buffer entry times out and resends unacknowledged packets
305
receiver receives resent packet and acknowledges receipt
306
Sender receives packet acknowlegment and sends "message acknowledged" packet
307
Receiver acknowledges "message acknowledged" packet to sender
308
RMT and ORB entries are deallocated
309
Message and completion queue command sent to receiver's processor

RELIABLE MESSAGE TRANSPORT NETWORK

FIELD OF THE INVENTION

The invention relates generally to computerized networks, and more specifically to a network incorporating a reliable message transport protocol.

BACKGROUND

Computer systems have long relied on network connections to transfer data, whether from one computer system to another computer system, one computer component to another computer component, or from one processor to another processor in the same computer. Most computer networks link multiple computerized elements to one another, and include various functions such as verification that a message sent over the network arrived at the intended recipient, confirmation of the integrity of the message, and a method of routing a message to the intended recipient on the network.

These and other basic network functions are used to ensure that a message sent via a computerized network reaches the intended recipient intact and unaltered. When networks become noisy or when a network connection is faulty, network messages can be lost and not reach the intended destination. This is commonly due to physical factors like electrical noise, poor connections, broken or damaged wires, impedance mismatches between network components, and other such factors.

Similarly, when networks are congested, messages may not be forwarded through the network efficiently and reach the intended destination in a timely manner or in the order sent. Various problems such as broken routing links, deadlocks, livelocks, and message prioritization can result in some messages being delayed, rerouted, or in extreme cases failing to arrive at the intended destination altogether.

For these and other reasons, many computerized networks implement various forms of flow control, such as requiring acknowledgment that a first packet or message in a sequence of packets or messages has been received by the intended recipient before sending the second packet or message. In a more sophisticated example, the message sender restricts the number of packets or messages that can be transmitted before the sender receives acknowledgment of receipt from the intended recipient. This method provides confirmation of message delivery, but provides improved network throughput over the previous sequential packet method.

It is therefore desired to provide fast, reliable, and efficient messaging between elements in a computerized network.

SUMMARY

One example embodiment of the invention comprises a multiprocessor computer system comprising a sending processor node and a receiving processor node. The sending processor node is operable to send packets comprising part of a message to a receiver, to maintain a message buffer entry in the sender comprising the sent packets, to track acknowledgment from the receiver that sent packets have been received; to maintain a timer indicating the time since message data has been sent, and to resend packets not acknowledged upon the timer reaching a timeout state. The receiving processor node is operable to send acknowledgment to the sender that received packets have been received, to track packets using a received message table to track which packets comprising part of the message have been received and whether all packets in the message have been received, and to process packets once all packets in a message are received to reassemble the received message.

BRIEF DESCRIPTION OF THE FIGURES

FIG. 3 is a flowchart illustrating one example method of practicing an embodiment of the invention.

DETAILED DESCRIPTION

In the following detailed description of example embodiments of the invention, reference is made to specific example embodiments of the invention by way of drawings and illustrations. These examples are described in sufficient detail to enable those skilled in the art to practice the invention, and serve to illustrate how the invention may be applied to various purposes or embodiments. Other embodiments of the invention exist and are within the scope of the invention, and logical, mechanical, electrical, and other changes may be made without departing from the subject or scope of the present invention. Features or limitations of various embodiments of the invention described herein, however essential to the example embodiments in which they are incorporated, do not limit other embodiments of the invention or the invention as a whole, and any reference to the invention, its elements, operation, and application do not limit the invention as a whole but serve only to define these example embodiments. The following detailed description does not, therefore, limit the scope of the invention, which is defined only by the appended claims.

One example embodiment of the invention provides for reliable communication of messages comprising multiple packets between a sending node and a receiving node in a processor network. The sending processor node is operable to send packets comprising part of the message to a receiver, to maintain a message buffer entry in the sender comprising the sent packets, to track acknowledgment from the receiver that sent packets have been received; to maintain a timer indicating the time since message data has been sent, and to resend packets not acknowledged upon the timer reaching a timeout state. The receiving processor node is operable to send acknowledgment to the sender that received packets have been received, to track packets using a received message table to track which packets comprising part of the message have been received and whether all packets in the message have been received, and to process packets once all packets in a message are received to reassemble the received message.

Figure 1:
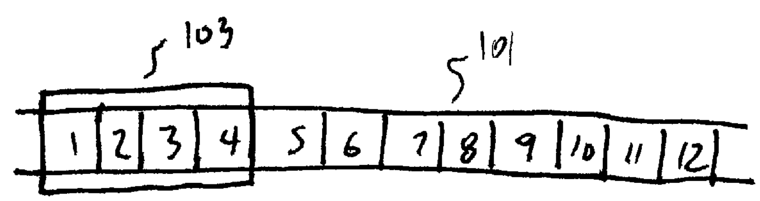
FIG. 1 shows a sliding window protocol method, consistent with some embodiments of the prior art.

FIG. 1 illustrates an example method of managing message delivery confirmation and flow control, consistent with the prior art. This method is sometimes known as a sliding window due to its use of a window defining active packets or messages that can be communicated via the network. Packets, messages, and frames are all terms used to refer to individual data elements, and can each be used as a network data element for purposes of the examples presented here. In some examples, messages comprise multiple packets, and each packet travels through the network independently, while in other examples each packet may contain a complete message or multiple messages.

In one example, a series of packets in a sending element 101 are being sent to a receiver 102. The sender is able to send packets 1-4, which are within window 103, before receiving acknowledgment from the receiver that any packet has arrived intact. Once the sender has received acknowledgment that packet 1 has arrived safely at the receiving element, the window slides to the right and the sender is able to send packet 5. Similarly, when acknowledgment of packet 2's receipt is received in the sender, packet 6 can be sent. The window therefore always includes any packets sent but not yet acknowledged, which serves to control the number of packets in flight at any one time.

Use of a sliding window in a network where it takes significant time for a message to reach a sender can therefore be used to significantly improve network throughput, such that four packets from the sender can be traveling at any given time rather than the single packet in flight at any given time in a traditional send/acknowledge message system. Choice of window size is an inexact science, and depends on factors such as network utilization, the capacity of the network path used to carry messages, and other such factors. For example, a network having four buffers or intermediate nodes between a sender and receiver will not benefit from a window size of eight rather than four packets, as there is no network capacity to handle such a large number of packets in flight at the same time. Similarly, windows that are too small result in underutilization of the network capacity, and less than optimal throughput. Sophisticated sliding window algorithms can therefore adapt the window size to the utilization and channel capacity of the link between network elements.

In some further embodiments, the receiver also maintains a receiving window 104 of packets it is able to accept, and typically discards any packets received outside this window without reply. In this example, it is prepared to receive packets 1-4, but cannot receive packet 5. The sender maintains the data for each of the packets in its window, so that the packet can be resent if acknowledgment of receipt is not received. A window size of one for the receiving window 104 means that the receiver will only receive packets in order, but larger windows such as the four-packet window illustrated here.

When the receiver fails to receive a certain packet, but receives later packets in the window correctly, it discards the subsequent packets or frames using what is knows as a "go back n" protocol. The receiver refuses to accept any packet other than the next packet in order, and the sender eventually reaches a time-out state for receipt of acknowledgment of the lost or damaged packet. More specifically, when acknowledgment of receipt of the packet is not received from the sender in a prescribed amount of time, a timeout is reached and the packet is resent from buffer memory in the network interface. Packets after the lost or damaged packet are then also sent in order, disregarding whether they were previously sent as the receiver will not accept packets out of order even if the packets were previously sent and reached the receiver intact.

Further examples of sliding window implementations include links using multiple channels from each node in the network, such that a network node can send data down two, three, or more different channels to the intended receiver. Loss of one or more channels in the link can therefore be tolerated, but loss of a router or the entire link generally cannot. Further, if packets take different channels or paths through the network, they may arrive at the receiver out of order. This can be remedied by sending packets down a single channel, but routing flexibility and efficiency of using multiple channels is lost.

The invention therefore provides in one example a network system, including hardware, software, and various methods, for providing reliable transport of messages across a network that may have unreliable network links, including adaptive routing in the network that provides for out-of-order packet handling. Various embodiments include detecting lost packets including packets lost among a stream of out-of-order packets, and selectively resending lost packets.

In one such example, transfer of a message from a sending node to a receiving node, such as from one processor to another in a processor interconnect network, uses message identifiers to identify packets belonging to the same message. Identifying and reordering packets to reconstruct the message is handled in the receiver, which is operable to receive and reorder the packets to recreate the message.

The receiver returns acknowledgment for each packet received, and the sender keeps packet data buffered at least until an acknowledgment is received that the packet has been received successfully. This allows for retransmission of packets that are not acknowledged, such as by use of a timer. The sender will deem that a packet has "timed out" a given amount of time after it is sent and no acknowledgment of receipt is received in reply, and will resend the timed-out packets. Because other mechanisms allow for out-of-order packet receipt in sending a message from the sender to the receiver, the receiver will resend only those packets that are lost or damaged, and need not resend the faulty packet and all packets sent thereafter.

Figure 2:
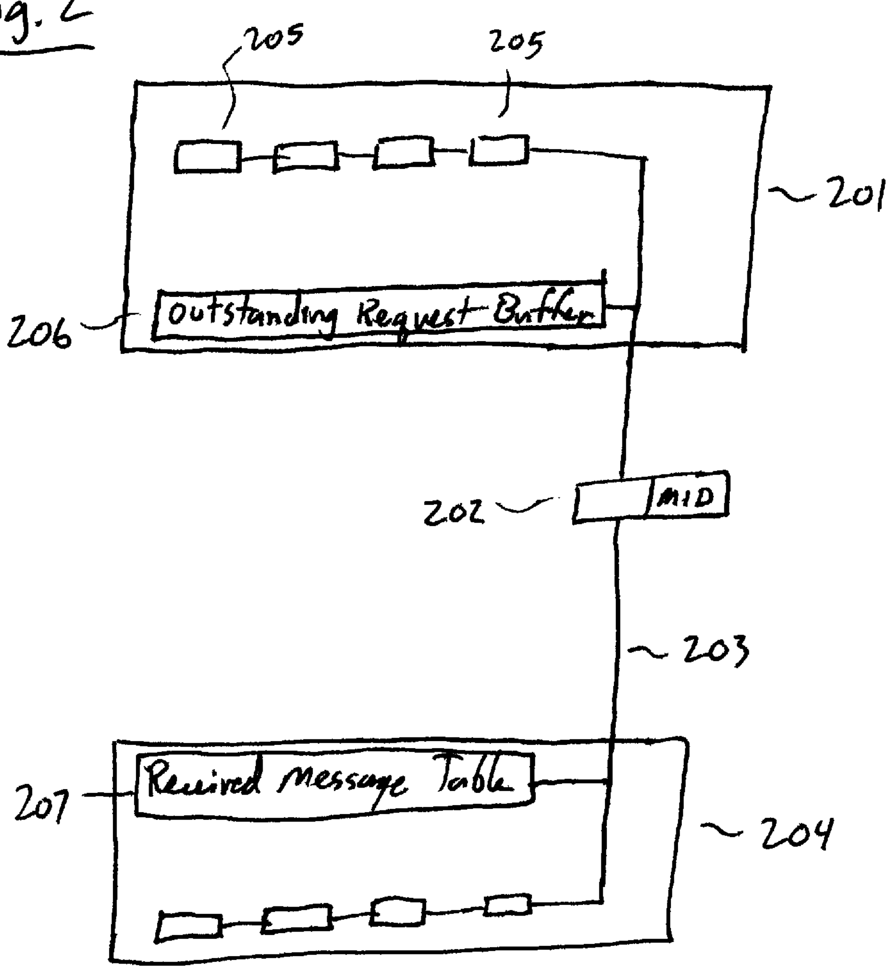
FIG. 2 is a block diagram of a computerized network, consistent with some embodiments of the invention.

FIG. 2 is a block diagram including sending and receiving network elements, used to illustrate a more detailed network packet exchange protocol consistent with an example embodiment of the invention. Referring to FIG. 2, a sender 201 sends packets 202 over a network 203 to a receiver 204. The sender has a queue of packets 205 that are formatted for transport over the network. As the packets are sent sequentially from the sender over the network, they are stored in an outstanding request buffer (ORB) 206, which serves as a replay buffer. The source stores a copy of each sent packet in the outstanding request buffer, and the stored and sent packet includes a message ID to identify the message that the packet belongs to and an indicator of where the packet is stored in the source's outstanding request buffer.

After sending all the packets for a particular message, the source sends a "message complete" packet that includes a count of the number of packets that make up that message. The "message complete" packet contains a completion queue (CQ) event that will be used to signal software at the destination when the message has been fully received. A copy of the "message complete" packet is stored in the outstanding request buffer 206 along with the other packets sent from the sender 201.

The destination device 204 eventually receives the packets, and delivers them to the destination buffer memory. For every received packet, an acknowledgment is sent, including the packet's outstanding request buffer index or location and the message ID of the packet.

Each message being received is tracked in a received message table 207 in the destination or receiver, by allocating a table entry for the message. In one such example, the table is a large hash table indexed by source or sender and by message ID. If no matching table entry is found for a received packet, a new received message table entry is created.

When the destination 204 receives a "message complete" packet, it stores an indication that the "message complete" message was received along with completion queue data in the received message table. The destination may receive the "message complete" packet before receiving all packets that are a part of the message, such as where packets are received out of order due to routing or network traffic, or where one or more packets are lost or damaged in transmission. In one example, the received message table manages a counter for each message, such that the counter is initialized to zero and is incremented for every packet received that is part of the message. When the "message complete" packet is received, the number of packets in that message are subtracted from the counter value, so that when the counter again reaches zero the recipient 204 has received all packets in that message. Note that in an example where the "message complete" packet is received before the last two packets comprising part of the message are received, the counter value will be −2, and will increment back to zero as each of the remaining two packets are received and processed.

The destination is therefore able to determine when all packets in a message have been received, even if message packets are received after a message complete packet. In this example, the sender and receiver are processors and the network 203 is a processor interconnect network, and once the received message is complete a completion queue event is delivered to the destination processor. The received message table entry is also then marked complete, but is not yet deallocated.

In a further embodiment, the source detects that a "message complete" packet has been sent, and tracks an outstanding packet counter for the particular message. The outstanding packet counter for a particular message is incremented whenever a packet for a given message is sent, and is decremented when acknowledgment of the packet is received from the destination. When all packets have been sent and confirmation of receipt of all packets has been received from the destination, the source sends a "message acknowledged" packet to the destination as an indicator that the message is completely received, in case a received message table entry wasn't able to be allocated or otherwise failed to detect receipt of all packets in the message. In this example, the "message acknowledged" packet is stored in the "outstanding request buffer" along with the other sent packets.

The destination therefore only receives a "message acknowledged" packet after receiving all the other packets in a message, including in some embodiments the "message complete" packet. The received message table deallocates the message table entry that should already be marked complete upon receipt of the "message acknowledged" packet, and sends an acknowledgment of the "message acknowledged" packet back to the sender. If no received message table entry was allocated on receipt of the first packet in the message, there will not be a received message table counter that reaches zero, triggering recognition of completed receipt of the message in the destination 204. In this case, the "message acknowledged" packet tells the destination that the message really is complete, and that it can deliver a completion queue event to the local processor. The destination also sends a "message acknowledged" acknowledgment packet back to the receiver, and deallocates any received message table entry created after the first packet in the message was received.

Use of a particular message ID is therefore complete in the destination when the "message acknowledged" acknowledgment is sent, and is complete in the sender when the acknowledgment is received back in the sender. The source manages message IDs such that a message ID is not reused until its previous use is determined to be complete, and in the unlikely event all message IDs are being used any sending of new packets stalls until a message ID becomes free. More sophisticated examples allow use of nonsequential free message IDs, or allocate sufficient message IDs that reuse is very unlikely to occur in normal operation.

Outstanding request buffer 206 entries in the sender 201 in some further embodiments have timers associated with them, such that if an entry times out it is likely that one or more packets in a message have been lost. When an outstanding request buffer entry times out, the hardware of the sender 201 generates an interrupt for software to manage the problem. The timer duration is chosen considering both that it is undesirable for an outstanding buffer request entry to time out while there is still a significant chance that some packet from the associated message or acknowledgment of receipt of some packet in the message is making its way through the network, and that excessive delay in correcting lost or missing packets in a message introduces undesirable latency or slowdown into the network system.

In one further example, the outstanding request buffer includes data indicating which rail or network link was used to transmit a data packet to the receiver, such that a consistently unreliable or failed network link can be identified as packets sent over the failing link fail to reach the destination, and packets can be sent via other links or routes while the error is reported so that it can be repaired. In various embodiments, the failed link is reconfigured such as by disabling a failed or faulty link, routing packets around a failing link such as by reconfiguring routing tables in the various network elements, or taking other such actions.

Packets that are retransmitted upon timeout of the outstanding request buffer message entry are marked as retransmitted packets, and are not counted as received packets for a particular message in the received message table of the destination 204. Instead, the "message acknowledged" packet sent from the sender upon receipt of acknowledgment of each packet in the message is used to indicate completion of the message in the destination.

To prevent the possibility of delivering duplicate completion queue events to the destination, packet acknowledgment messages include a bit indicating whether a received message table entry was allocated for the message ID identified in the packet being acknowledged. The sender can monitor the received message table entry bits, and will mark the "message acknowledged" packet as a "lone message acknowledged" packet so that it can be processed in the receiver without a matching received message table entry. If a regular "message acknowledged" packet matches a received message table entry in the receiver, then the received message table entry is deallocated, a message acknowledge acknowledged packet is returned to the sender, and a completion queue event is processed. If the "message acknowledged" packet does not match a received message table entry, it is assumed to be a duplicate and is ignored, as a "lone message acknowledged" packet should be sent if it is a legitimate message with no received message table entry. When a "lone message acknowledged" packet is received, there should be no received message table entry, so the message is processed and a message acknowledged acknowledged packet is returned without changing the received message table. In a further example, the received message table is checked to make sure no corresponding message entry is present, ensuring proper operation of the messaging system.

If a "lone message acknowledged" packet times out in the outstanding request buffer, the error handling software of this example will not know whether the original "lone message acknowledged" packet arrived safely. If the messaging system is modified to determine whether the completion queue event had been delivered or could handle duplicate completion queue events, this situation can be recovered by resending the completion queue event.

FIG. 3 is a flowchart, illustrating one example method of operating the network of FIG. 2. At 301, the sender allocates an outstanding request buffer for a new message, and sends packets containing the message at 302. Each of the sent packets is also stored in the outstanding request buffer, should the packets need to be resent. When the first packet reaches the destination, a received message table entry is allocated at 303, and the packets are buffered until all packets in the message are received. At 304, the received message table counter has not yet returned to zero, but no further packets are received for the pending message, suggesting a packet has been lost or damaged. The sender therefore times out, and resends any packets that it has not received an acknowledgment for from the receiver.

When the packets are resent and the sender receives confirmation of receipt of all packets at 305, the sender sends a message acknowledged packet at 306. The receiver receives this packet and sends acknowledgment of its receipt back to the sender at 307. The received message table entry and outstanding request buffer table entry are deallocated at 308, and the message and completion queue command are sent to the receiving node processor at 309.

In this example, a packet was lost and the outstanding request buffer's timeout and packet resend mechanism was used to resend the lost packet. Confirmation of complete message receipt in the receiver was determined by receipt of the message acknowledged packet from the sender, but could similarly have been determined by incrementing a received packet counter in the receiver for the particular message being received.

The examples presented here are therefore only examples of certain embodiments of the invention, and do not limit or fully define the invention. Although specific embodiments have been illustrated and described herein, it will be appreciated by those of ordinary skill in the art that any arrangement that achieve the same purpose, structure, or function may be substituted for the specific embodiments shown. This application is intended to cover any adaptations or variations of the example embodiments of the invention described herein. It is intended that this invention be limited only by the claims, and the full scope of equivalents thereof.

The invention claimed is:

1. A method of reliably sending data in a computerized network, comprising:

sending packets comprising part of a message to a receiver;

sending a separate message complete packet to the receiver after sending all packets comprising part of the message, wherein the message complete packet indicates the number of packets in the message;

tracking in the receiver a number of received packets that comprise part of the message by counting in a counter the number of packets received comprising part of the message:

comparing the counted number of received packets comprising part of the message to the number of packets in the message;

maintaining a message buffer entry in the sender comprising the sent packets;

tracking acknowledgment from the receiver that sent packets have been received;

maintaining a timer indicating a time since message data has been sent; and resending packets not acknowledged upon the timer reaching a timeout state.

2. The method of claim 1, wherein the timer is a packet timer operable to count the time since a packet has been sent.

3. The method of claim 1, wherein the timer is a message timer operable to count the time since a message has been processed.

4. The method of claim 1, wherein resending packets not acknowledged comprises sending the packets using alternate routing.

5. The method of claim 1, wherein the network is an interprocessor network in a multiprocessor computer system.

6. The method of claim 1, further comprising receiving the packets in the receiver in an order other than the order sent from the sender.

7. The method of claim 1, further comprising detecting when all packets have been received in receiver by tracking number of received packets in message.

8. A method of reliably receiving data in a computerized network, comprising receiving packets comprising part of a message from a sender;

receiving a separate message complete packet sent from the sender after sending all packets comprising part of the message, wherein the message complete packet indicates the number of packets in the message;

counting the number of received packets in a counter;

comparing the counted number of received packets comprising part of the message to the number of packets in the message;

sending acknowledgment to the sender that received packets have been received;

tracking packets using a received message table to track which packets comprising part of the message have been received and whether all packets in the message have been received by tracking the number of received packets that comprise part of the message; and processing packets once all packets in a message are received irrespective of the order packets were received to reassemble the received message.

9. The method of claim 8, wherein one or more of the packets comprise resent packets sent after the packets failed to reach the receiver before a timeout.

10. The method of claim 9, wherein the resent packets are sent using alternate routing.

11. The method of claim 8, wherein the network is an interprocessor network in a multiprocessor computer system.

12. The method of claim 8, further comprising buffering all sent packets in the sender so that sent packets can be resent.

13. A multiprocessor computer system comprising:

a sending processor node operable to send packets comprising part of a message to a receiving processing node, to maintain a message buffer entry in the sending processor node comprising the sent packets, to track acknowledgment from the receiving processing node that sent packets have been received; to maintain a timer indicating the time since message data has been sent, to send a separate message complete packet to the receiver after sending all packets comprising part of the message, wherein the message complete packet indicates the number of packets in the message, and to resend packets not acknowledged upon the timer reaching a timeout state; and a receiving processing node operable to send acknowledgment to the sending processor node that received packets have been received, to track packets using a received message table to track which packets comprising part of the message have been received and whether all packets in the message have been received by counting the number of received packets that comprise part of the message in a counter and comparing the counted number of received packets comprising part of the message to the number of packets in the message, and to process packets once all packets in a message are received to reassemble the received message.

14. The multiprocessor computer system of claim 13, wherein the timer is a packet timer operable to count the time since a packet has been sent.

15. The multiprocessor computer system of claim 13, wherein the timer is a message timer operable to count the time since a message has been processed.

16. The multiprocessor computer system of claim 13, wherein resending packets not acknowledged comprises sending the packets using alternate routing.

17. The multiprocessor computer system of claim 13, wherein the network is an interprocessor network in a multiprocessor computer system.

18. The multiprocessor computer system of claim 13, wherein the packets are received in the receiving processing node in an order other than the order sent from the sending processor node.

19. The multiprocessor computer system of claim 13, further comprising detecting when all packets have been received in receiver by tracking number of received packets in message.

* * * * *